United States Patent
Yu et al.

(10) Patent No.: US 11,402,603 B2
(45) Date of Patent: Aug. 2, 2022

(54) OPTICAL ELEMENT DRIVING MECHANISM

(71) Applicant: TDK TAIWAN CORP., Taoyuan (TW)

(72) Inventors: Shiang-Ming Yu, Taoyuan (TW); Chao-Chang Hu, Taoyuan (TW); Chih-Wei Weng, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 420 days.

(21) Appl. No.: 16/547,079

(22) Filed: Aug. 21, 2019

(65) Prior Publication Data

US 2020/0064587 A1   Feb. 27, 2020

Related U.S. Application Data

(60) Provisional application No. 62/722,353, filed on Aug. 24, 2018.

(30) Foreign Application Priority Data

Jul. 4, 2019   (CN) .......................... 201921037215.5

(51) Int. Cl.
   *G02B 7/09*    (2021.01)
   *H02K 41/035*  (2006.01)
   (Continued)

(52) U.S. Cl.
   CPC ............ *G02B 7/09* (2013.01); *G02B 27/646* (2013.01); *G03B 13/36* (2013.01);
   (Continued)

(58) Field of Classification Search
   CPC . G02B 7/09; G02B 27/646; G03B 2205/0069
   See application file for complete search history.

(56) References Cited

U.S. PATENT DOCUMENTS

| | | | |
|---|---|---|---|
| 2016/0259094 A1* | 9/2016 | Aschwanden | G02B 3/14 |
| 2017/0168314 A1* | 6/2017 | Chan | G02B 7/023 |
| 2019/0103799 A1* | 4/2019 | Kawanabe | G03B 3/10 |

FOREIGN PATENT DOCUMENTS

KR      20150091860 A   *   8/2015

OTHER PUBLICATIONS

Machine translation of KR-20150091860-A, retrieved in PE2E Search Dec. 10, 2021 (Year: 2021).*

* cited by examiner

*Primary Examiner* — Cara E Rakowski
(74) *Attorney, Agent, or Firm* — Muncy, Geissler, Olds & Lowe, P.C.

(57) ABSTRACT

An optical element driving mechanism is provided. The optical element driving mechanism includes a fixed part, a movable part, and a first driving assembly. The movable part moves relative to the fixed part and holds an optical element with an optical axis. The first driving assembly drives the fixed part to move relative to the movable part. The first driving assembly includes a first coil and a first magnetic element. The first coil includes a winding axis, and the winding axis is not perpendicular to the optical axis. The first coil and the first magnetic element are arranged in a direction that is substantially perpendicular to the optical axis. When viewed along a direction that is parallel to the optical axis, the first coil does not overlap the first magnetic element.

19 Claims, 18 Drawing Sheets

(51) Int. Cl.
*G03B 13/36* (2021.01)
*G02B 27/64* (2006.01)
(52) U.S. Cl.
CPC . *H02K 41/0356* (2013.01); *G03B 2205/0015* (2013.01); *G03B 2205/0069* (2013.01)

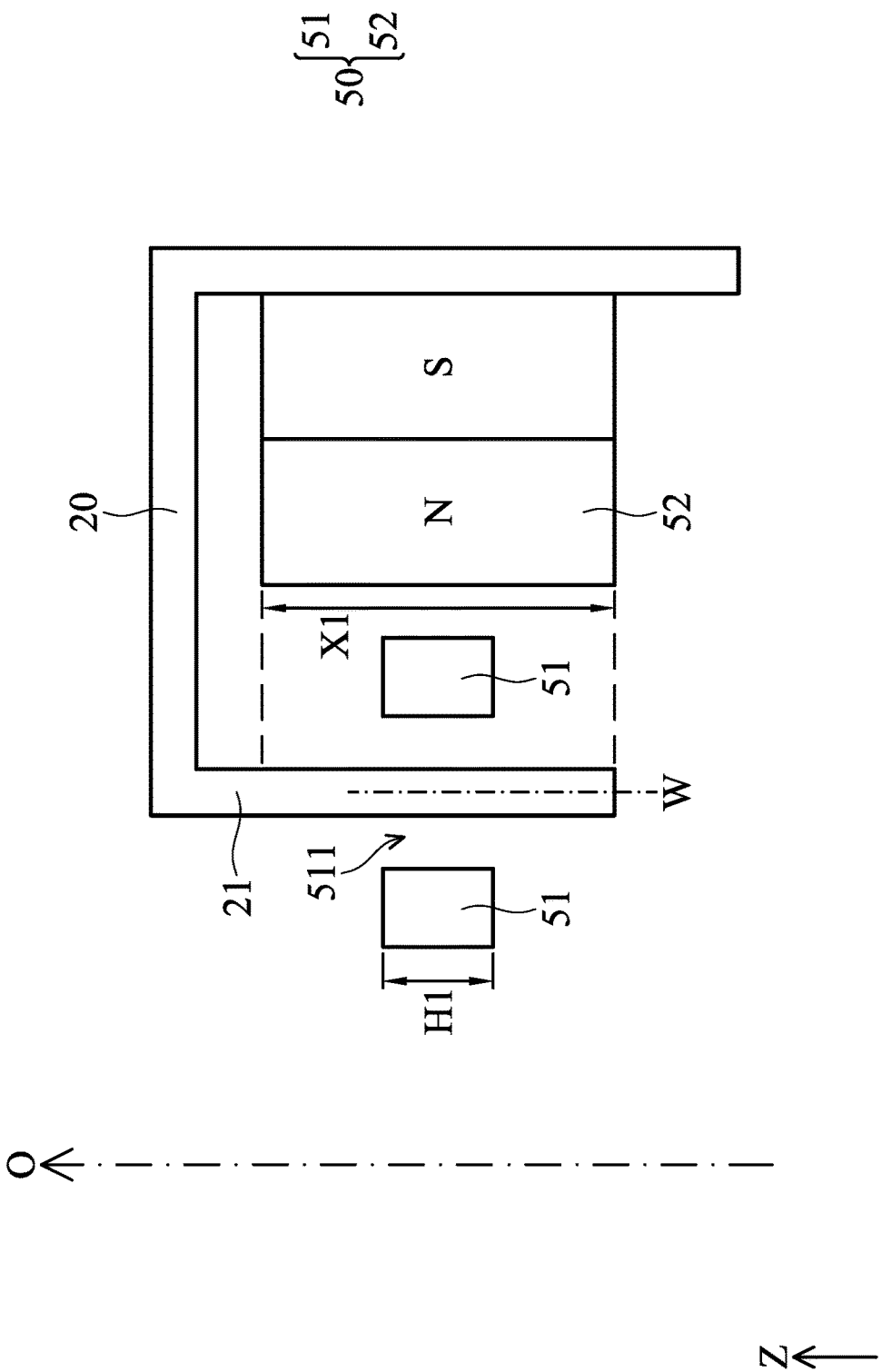

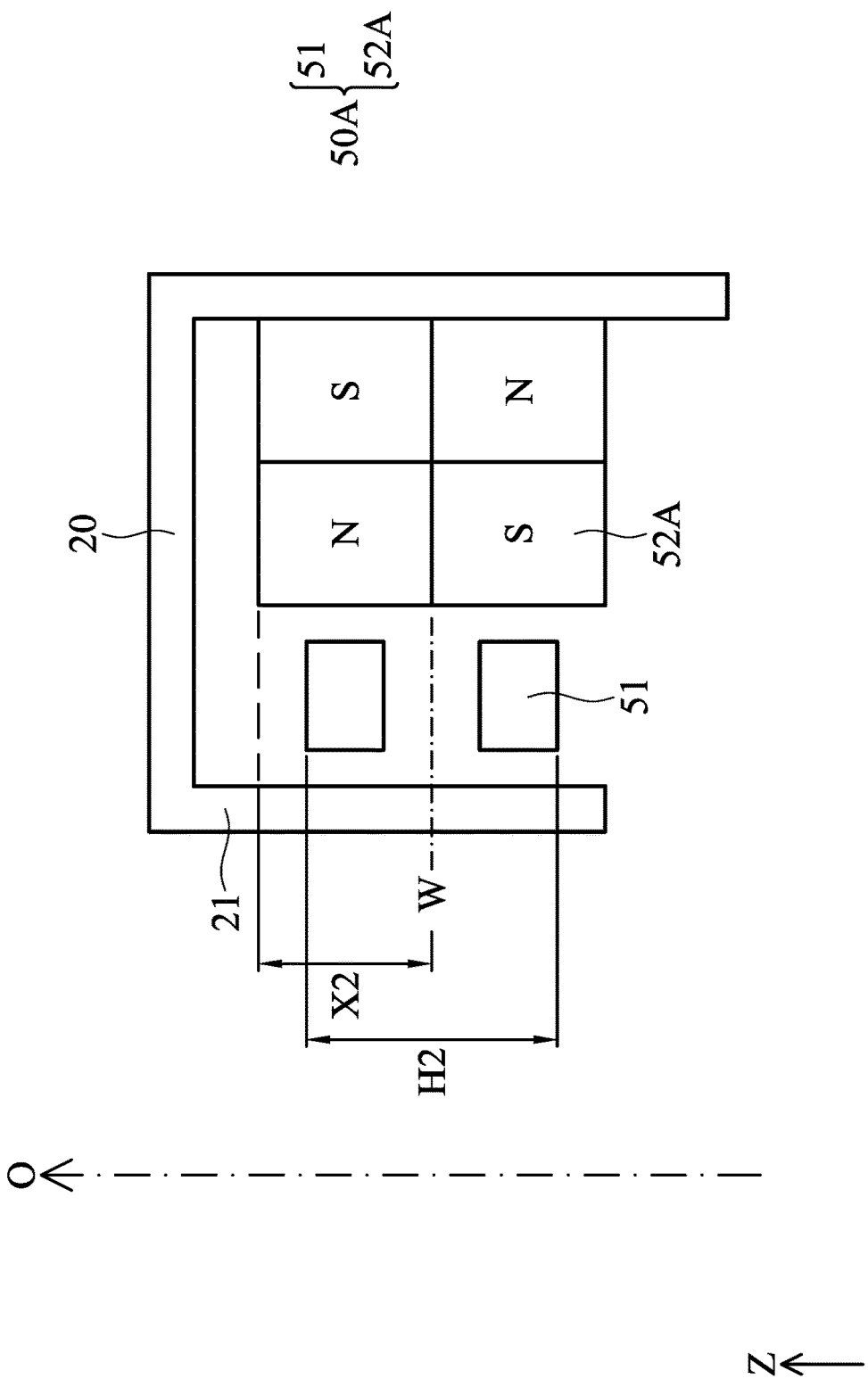

OPTICAL ELEMENT DRIVING MECHANISM

CROSS-REFERENCE TO RELATED APPLICATIONS

The present application claims priority to U.S. Provisional Patent Application No. 62/722,353, filed on Aug. 24, 2018, and C.N. Patent Application No. 201921037215.5, filed on Jul. 4, 2019, which are incorporated by references herein in its entirety.

BACKGROUND OF THE DISCLOSURE

Field of the Disclosure

The present disclosure relates to a driving mechanism, and more particularly to an optical element driving mechanism.

Description of the Related Art

As technology has developed, many electronic devices (such as tablet computers and smartphones) are equipped with optical element driving mechanisms. One or more optical elements driven by the optical element driving mechanisms can capture images and record video. When a user uses an electronic device that is equipped with an optical element driving mechanism, shock or vibration may occur, which may cause the image or video to come out blurry. Therefore, the demand for higher quality images and videos is increasing. An optical element driving mechanism that is able to achieve displacement correction or displacement compensation is required.

A voice coil motor (VCM) is an optical element driving mechanism that is commonly used. A VCM uses a combination of a coil, a magnet, and a spring to drive an optical element to move in a direction that is parallel to or perpendicular to an optical axis, in order to achieve auto focus (AF) or optical image stabilization (OIS).

A shock or vibration of the optical element may be complicated. Moreover, a shock or vibration of the optical element may not be limited in the direction that is parallel to or perpendicular to the optical axis. For example, the optical element may tilt. Therefore, how to design an optical element driving mechanism to enhance the accuracy and the efficiency of displacement correction and tilt compensation and achieve miniaturization is a topic worth exploring and a problem worth solving.

BRIEF SUMMARY OF THE DISCLOSURE

According to some embodiments of the disclosure, an optical element driving mechanism is provided. The optical element driving mechanism includes a fixed part, a movable part, and a first driving assembly. The movable part moves relative to the fixed part and holds an optical element with an optical axis. The first driving assembly drives the fixed part to move relative to the movable part. The first driving assembly includes a first coil and a first magnetic element. The first coil includes a winding axis, and the winding axis is not perpendicular to the optical axis. The first coil and the first magnetic element are arranged in a direction that is substantially perpendicular to the optical axis. When viewed along a direction that is parallel to the optical axis, the first coil does not overlap the first magnetic element.

According to some embodiments of the disclosure, the first coil is located between the optical axis and the first magnetic element. Or, the first magnetic element is located between the optical axis and the first coil. The first driving assembly drives the movable part to move relative to the fixed part along a direction that is parallel to the optical axis. The fixed part includes a central axis, and the first driving assembly drives the movable part to generate an angular displacement of the optical axis relative to the central axis According to some embodiments of the disclosure, the first coil is disposed at the movable part, and the first magnetic element is disposed at the fixed part. A position of the first coil corresponds to a position of the first magnetic element. The movable part includes a holder holding the optical element, and the holder and the fixed part are separated by a distance. When viewed along a direction that is perpendicular to the optical axis, the first coil overlaps the holder. Or, the first coil completely overlaps the holder.

According to some embodiments of the disclosure, the fixed part includes a case made of a magnetic-permeable material. The case includes a protrusion that extends in a direction that is parallel to the optical axis. The first coil is provided with a perforation, and a portion of the protrusion of the case is located in the perforation of the first coil. The holder is provided with a receiving hole for receiving the first coil, and a portion of the protrusion of the case is located in the receiving hole.

According to some embodiments of the disclosure, the profile of the fixed part is substantially a rectangle. The first driving assembly consists of two first coils and two first magnetic elements. When viewed along a direction that is parallel to the optical axis, the two first coils and the two first magnetic elements are located on the diagonal line of the rectangle. Or, the two first coils and the two first magnetic elements are located at two opposite sides of the rectangle.

According to some embodiments of the disclosure, the profile of the fixed part is substantially a rectangle, the first driving assembly consists of four first coils and four first magnetic elements, and when viewed along a direction that is parallel to the optical axis, the four first coils and the four first magnetic elements are located at four corners of the rectangle. Or, the four first coils and the four first magnetic elements are located at four sides of the rectangle.

According to some embodiments of the disclosure, the optical element driving mechanism further includes a second driving assembly driving the movable part to move relative to the fixed part. The second driving assembly includes a second coil and a second magnetic element, the second coil surrounds the movable part, and the second magnetic element is disposed at the fixed part. When viewed along a direction that is parallel to the optical axis, the first coil partially overlaps the second coil.

According to some embodiments of the disclosure, the optical element driving mechanism further includes a second driving assembly driving the movable part to move relative to the fixed part. The second driving assembly includes two second coils and two second magnetic elements. Positions of the second coils correspond to positions of the second magnetic elements. A plane on which either of the two second coils is located is not parallel and not perpendicular to a plane on which the first coil is located. The second coils are disposed at opposite sides of the movable part, and the second magnetic elements are disposed on opposite sides of the movable part. When viewed along a direction that is perpendicular to the optical axis, the first coil partially overlaps one of the second coils, and the first magnetic element partially overlaps one of the second magnetic elements.

According to some embodiments of the disclosure, an optical element driving mechanism is provided. The optical element driving mechanism includes a fixed part, a movable part, and a first driving assembly. The movable part moves relative to the fixed part and holds an optical element with an optical axis. The first driving assembly drives the fixed part to move relative to the movable part. The first driving assembly includes a first coil and a first magnetic element. The first coil includes a winding axis, and the winding axis is not parallel to the optical axis. The first coil and the first magnetic element are arranged in a direction that is substantially perpendicular to the optical axis. When viewed along a direction that is parallel to the optical axis, the first coil does not overlap the first magnetic element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 8A-8C are schematic views of configurations of the case and the first driving assembly.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, such that the first and second features may not be in direct contact. The ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The preferred embodiments of this disclosure are described with the drawings.

Figure 1:
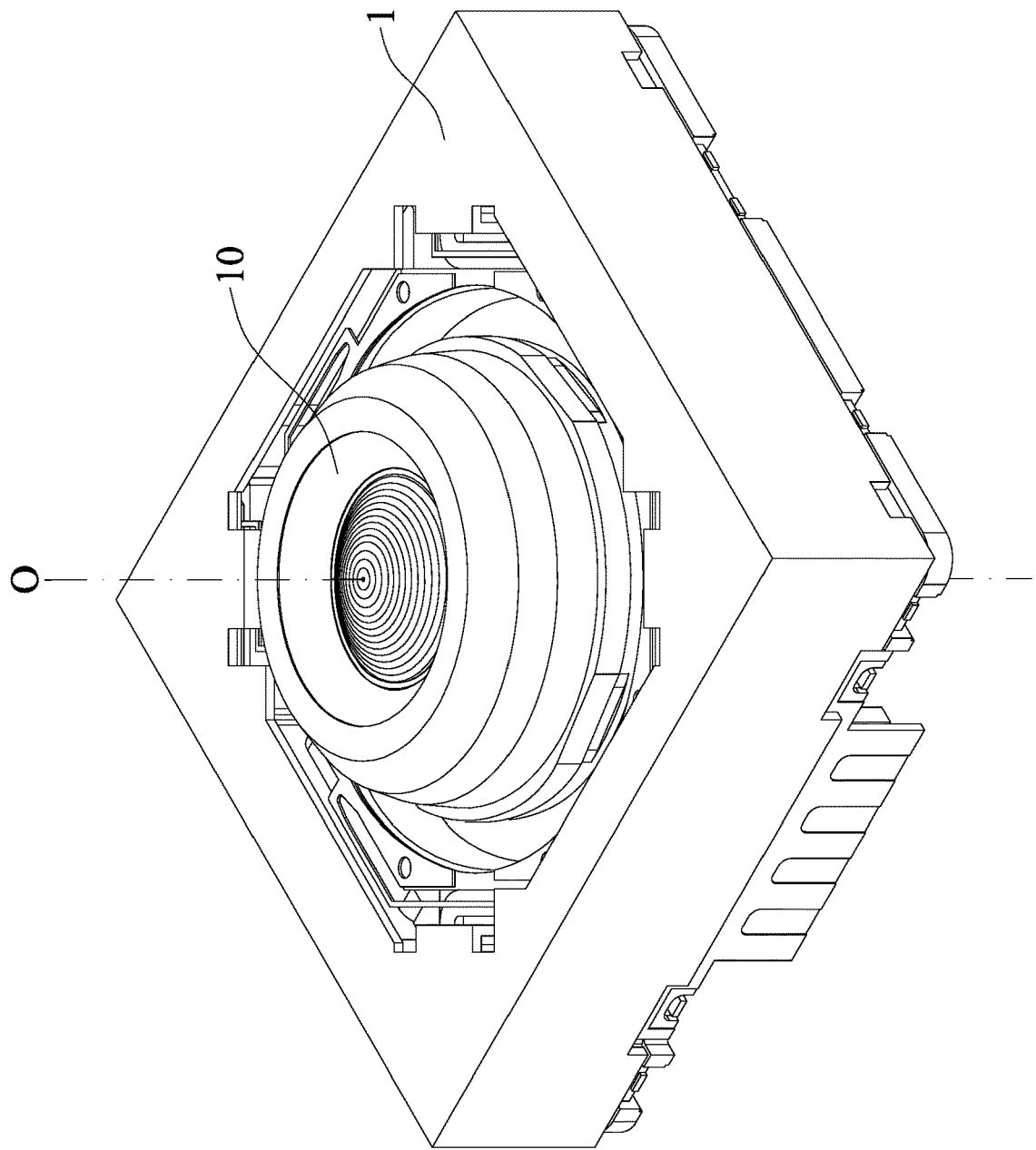
FIG. 1 is a perspective view of an optical element driving mechanism and an optical element in accordance with some embodiments of this disclosure.

FIG. 1 is a perspective view of an optical element driving mechanism 1 and an optical element 10 in accordance with some embodiments of this disclosure.

Figure 2:
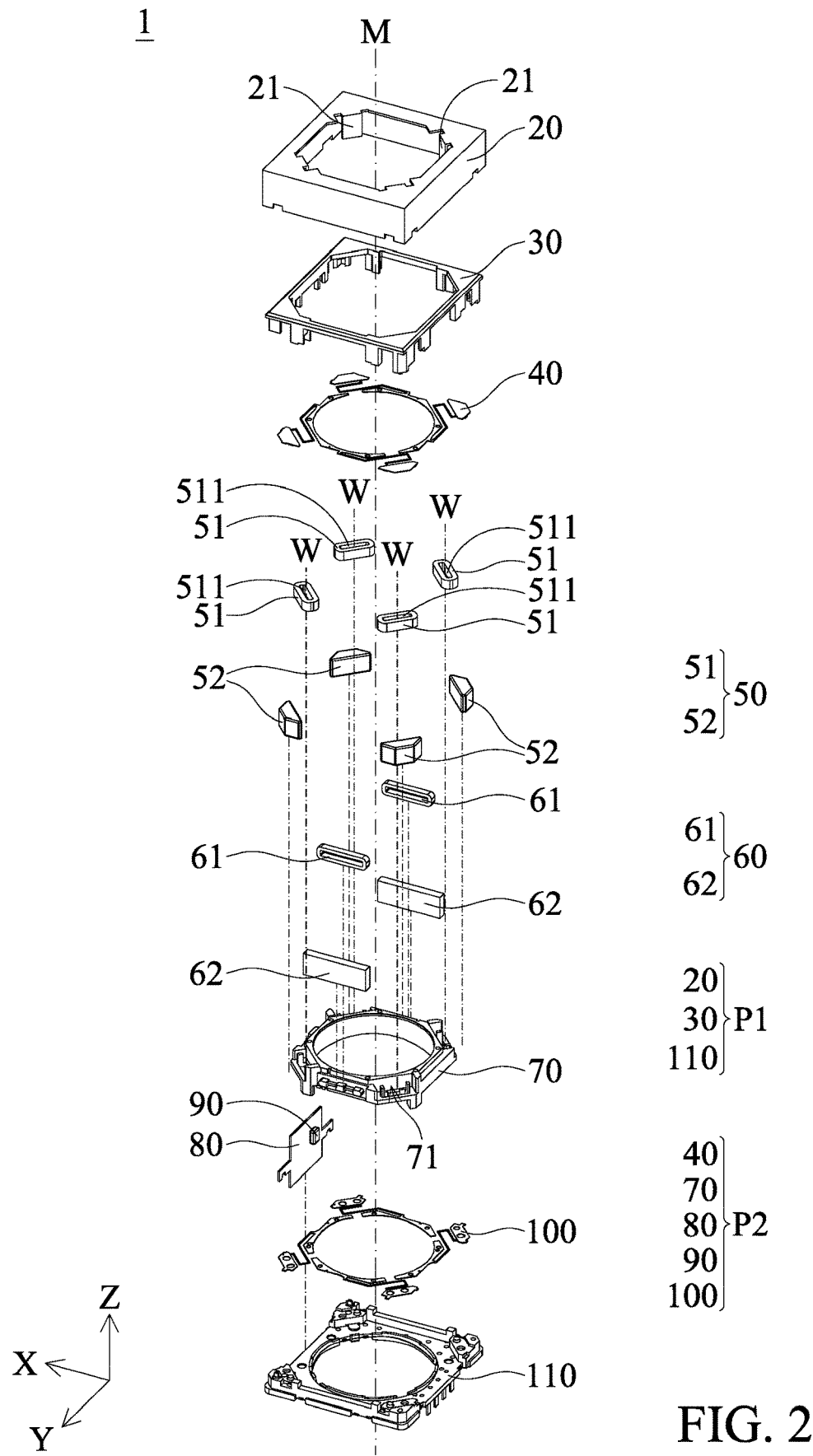
FIG. 2 is an exploded view of the optical element driving mechanism in FIG. 1.

FIG. 2 is an exploded view of the optical element driving mechanism 1 in FIG. 1. The optical element driving mechanism 1 includes a fixed part P1, a movable part P2, a first driving assembly 50, and a second driving assembly 60. The movable part P2 moves relative to the fixed part P1 and holds the optical element 10 with an optical axis O. The optical axis O is defined as an imaginary axis passing through the center of the optical element 10. The movable part P2 may be driven by the first driving assembly 50 and the second driving assembly 60 to move relative to the fixed part P1.

As shown in FIG. 2, in this embodiment, the fixed part P1 includes a case 20, a frame 30, and a bottom 110. The movable part P2 includes an upper spring 40, a holder 70, a circuit board 80, an electronic element 90, and a lower spring 100. The first driving assembly 50 includes four first coils 51 and four first magnetic elements 52. The second driving assembly 60 includes two second coils 61 and two second magnetic elements 62. The elements of the optical element driving mechanism 1 may be added or omitted depending on requirements of the users.

The fixed part P1 has a central axis M. The central axis M is defined as an imaginary axis passing through the center of the fixed part P1. When the optical element 10, the optical element driving mechanism 1, and a photosensitive element (not shown) are aligned, the optical axis O of the optical element 10 overlaps the central axis M of the fixed part P1.

The case 20, the frame 30, and the bottom 110 of the fixed part P1 are sequentially arranged along the central axis M. The case 20 is located above the frame and the bottom 110. The methods for connecting the case 20 and the bottom 110 may be engagement, welding, etc. Other elements of the optical element driving mechanism 1, such as the movable part P2, the first driving assembly 50, and the second driving assembly 60, may be accommodated in a space formed by the combination of the case 20 and the bottom 110.

The case 20 is made of a material with magnetic permeability. Preferably, the case 20 is made of a material with high magnetic permeability, such as a ferromagnetic material, including iron/Ferrum (Fe), Nickel (Ni), Cobalt (Co) and its alloy. The case 20 includes four protrusions 21 that extend in a direction that is parallel to the optical axis O for protecting the magnetic force and enhancing the magnetic force.

The frame 30 is made of a non-conductive material or a material with magnetic permeability, for example, plastic or metallic alloy. When the frame 30 is made of the material with magnetic permeability, the frame 30 may also have functions for protecting the magnetic force and enhancing the magnetic force. Compared with non-conductive material, the frame 30 made of the material with magnetic permeability has higher structural strength.

The upper spring 40 and the lower spring 100 of the movable part P2 are flexible and may be made of metal. The upper spring 40 and the lower spring 100 are respectively electrically connected to the first driving assembly 50. In some embodiments, the lower spring 100 may be omitted.

The holder 70 may be designed to have four receiving holes 71 to receive four first coils 51 respectively. The holder 70 is hollow to hold the optical element 10. A screw and corresponding threaded structure may be configured between the holder 70 and the optical element 10, so that the optical element 10 may be fixed in the holder 70 better. The holder 70 and the case 20 and the bottom 110 of the fixed part P1 are separated a distance, i.e. the holder 70 is not in direct contact with the case 20 and the bottom 110.

The holder 70 may be resiliently suspended by the upper spring 40 and the lower spring 100. In particular, a portion of the frame 30 and a top surface of the holder 70 are connected by the upper spring 40, and a portion of the frame 30 and a bottom surface of the holder 70 are connected by the lower spring 100. When the movable part P2 moves relative to the fixed part P1, the movement range of the holder 70 is restricted because the holder 70 is held resiliently by the upper spring 40 and the lower spring 100. Therefore, collision between the holder 70 and the case 20 or the bottom 110 does not occur. Therefore, the holder 70 and the optical element 10 therein are not damaged when the optical element driving mechanism 1 moves or being impacted by the environment.

It should be noted that the movable part P2 further includes a sensed object and a sensor (not shown) in other embodiments of this disclosure. The sensed objected is disposed close to the holder 70, and the position of the sensor corresponds to the position of the sensed object. The sensed object may be a magnetic element, such as a magnet. The sensor may be a giant magnetoresistive effect sensor (GMR sensor), a tunneling magnetoresistive effect sensor (TMR sensor), etc. When the holder 70 moves, the sensed object near the holder 70 moves as well, and the magnetic field of the sensed object changes. Additionally, the change of the magnetic field of the sensed object is detected by the sensor. Therefore, the position of the holder 70 may be known. Furthermore, the position adjustment and the displacement control of the holder 70 may be conducted.

The circuit board 80 of the movable part P2 may be a flexible printed circuit (FPC), a rigid-flexible composite board, etc. The electronic element 90 is disposed at the circuit board 80. The electronic element 90 may include a passive element, such as capacitance, resistance, inductance, etc. In FIG. 2, the circuit board 80 and the electronic element 90 are disposed at a side of the optical element driving mechanism 1. In other embodiments, the circuit board 80 and the electronic element 90 are disposed on the bottom 110.

The first coil 51 of the first driving assembly 50 has a substantially elliptical structure. The first magnetic element 52 of the first driving assembly 50 may be a magnet, such as a permanent magnet. The first coil 51 is provided with a perforation 511 and a winding axis W. The winding axis W is defined as an imaginary axis passing through the center of the perforation 511, and the winding axis W is not perpendicular to the optical axis O. In this embodiment, the winding axis W is substantially parallel to the optical axis O. The deviation generated during assembly or other reasons may cause the winding axis W not completely parallel to the optical axis O.

The "height" of the element described herein is defined as the length parallel to the optical axis O of the element for clear illustration. The demand for a thinner electronic device is increasing, and thus the height of the optical element driving mechanism 1 installed in the electronic device have to be reduced as well.

Figure 6:
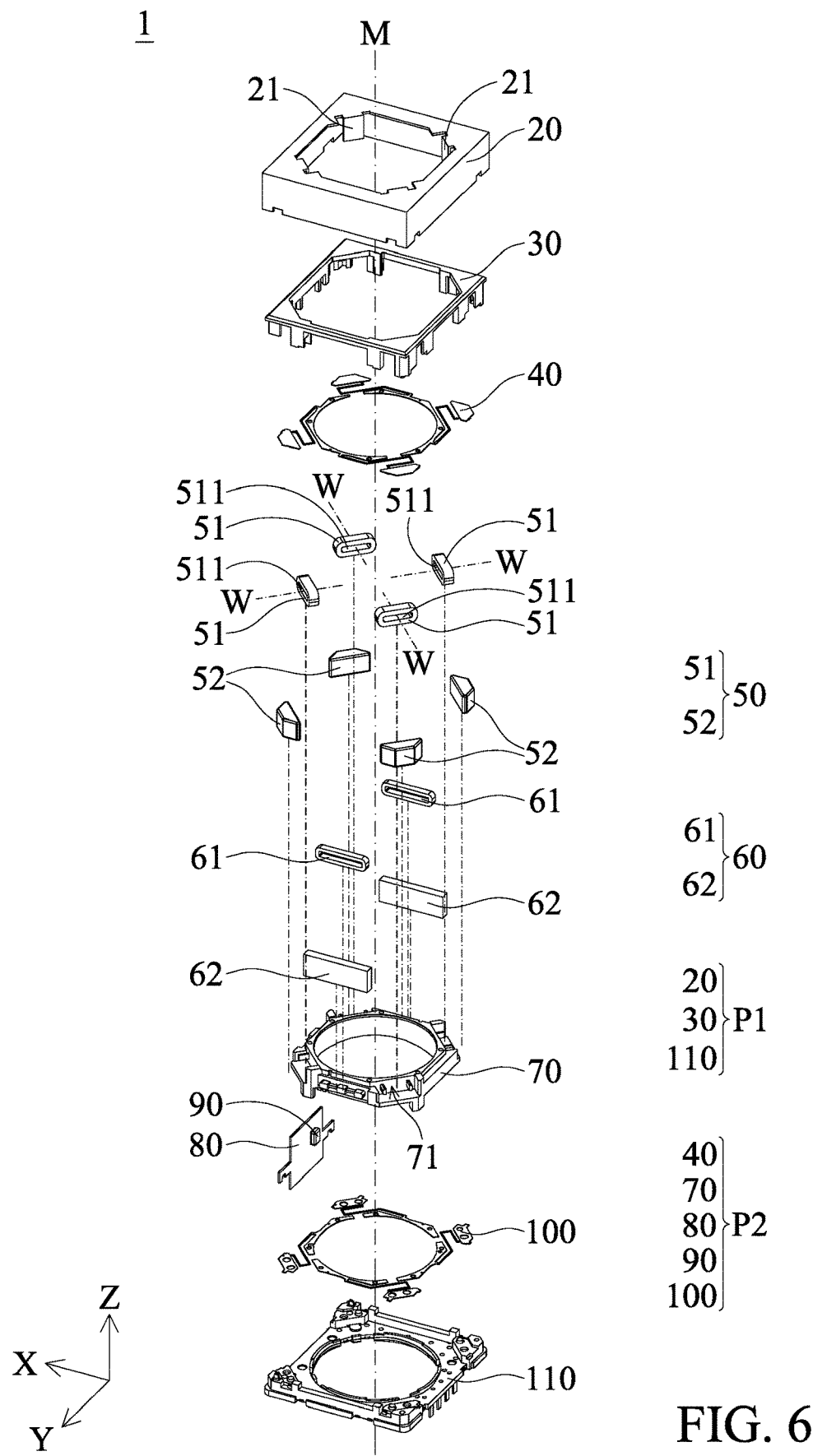
FIG. 6 is an exploded view of the optical element driving mechanism in accordance with some embodiments of this disclosure.
Figure 7:
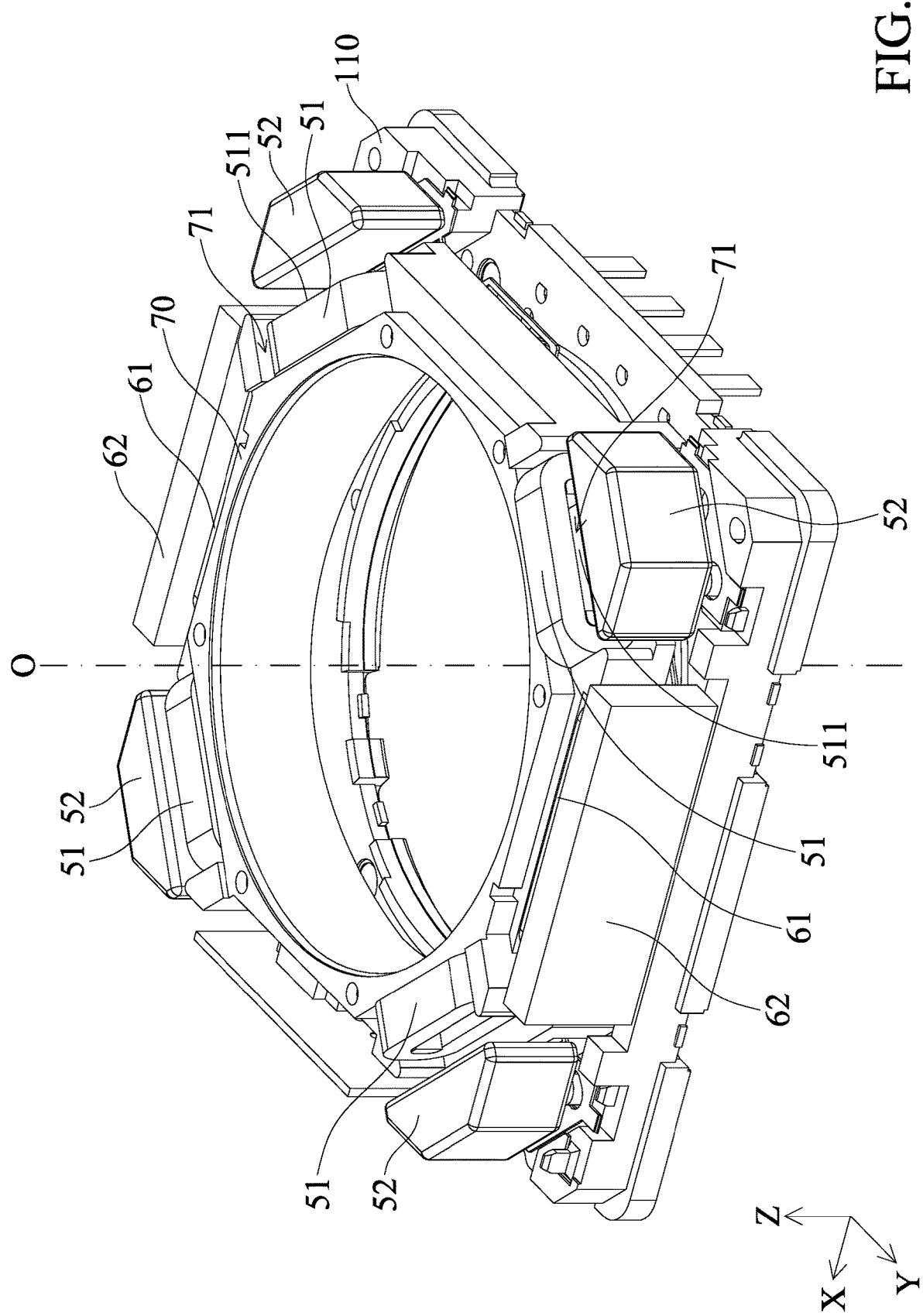
FIG. 7 is a perspective view of the optical element driving mechanism in FIG. 6.
Figure 8B:
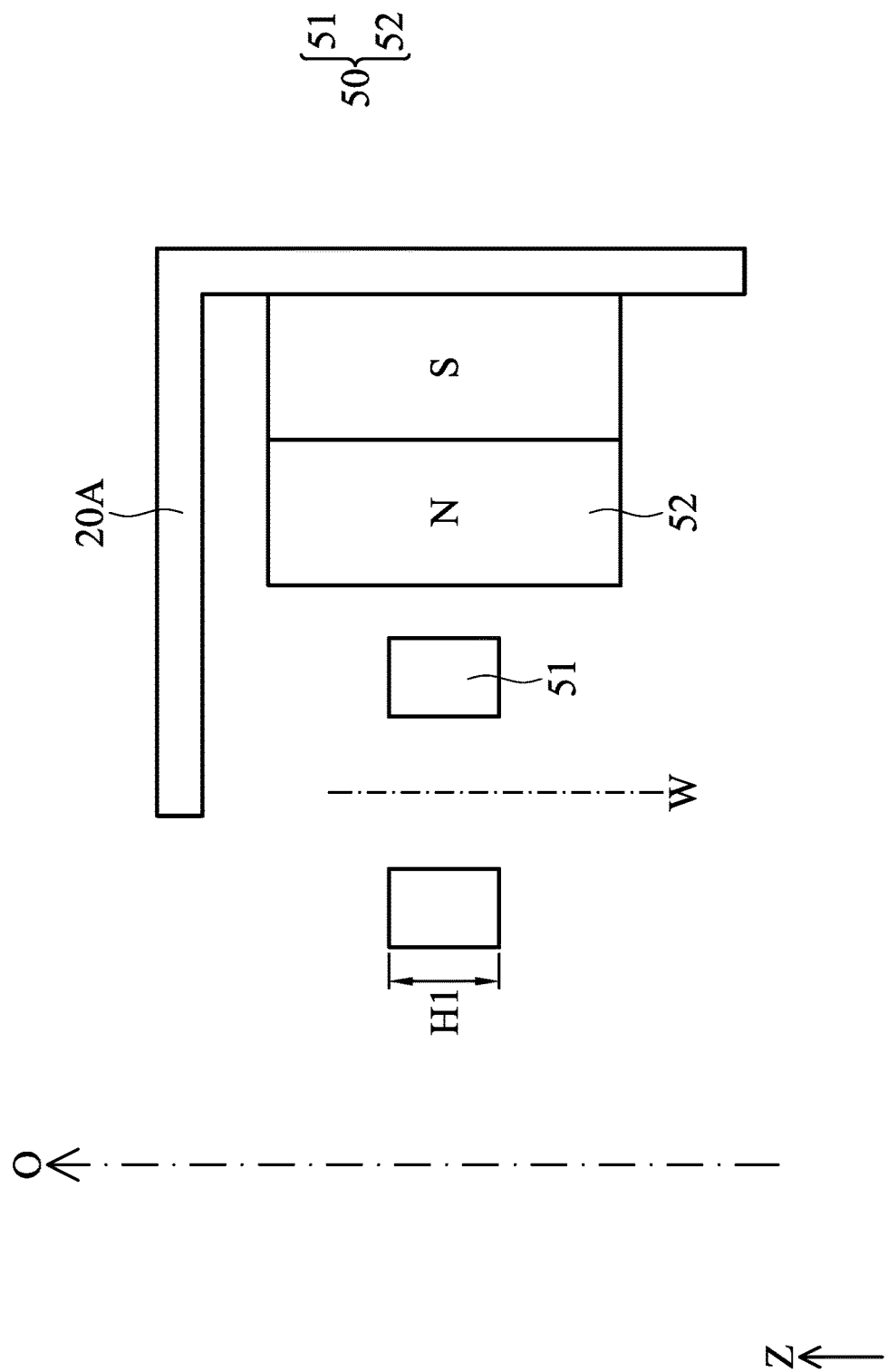

In this embodiment, the winding axis W of the first coil 51 is not perpendicular to the optical axis, so that the advantage of reducing the height of the optical element driving mechanism 1 is achieved. It is because the first coil 51 is configured to be horizontal (the winding axis W is substantially parallel to the optical axis O). Compared with the vertical configuration (i.e. The first coil 51 is rotated by 90 degrees, and the winding axis W is perpendicular to the optical axis O, as shown in FIG. 6, FIG. 7, and FIG. 8C.), the height of the horizontal first coil 51 is less than that of the vertical first coil 51, so that miniaturization of the height of the optical element driving mechanism 1 is achieved. The height difference between the horizontal first coil 51 and the vertical first coil 51 may be discussed in further detail in regard to FIG. 6, FIG. 7, and FIGS. 8A-8C.

Figure 3:
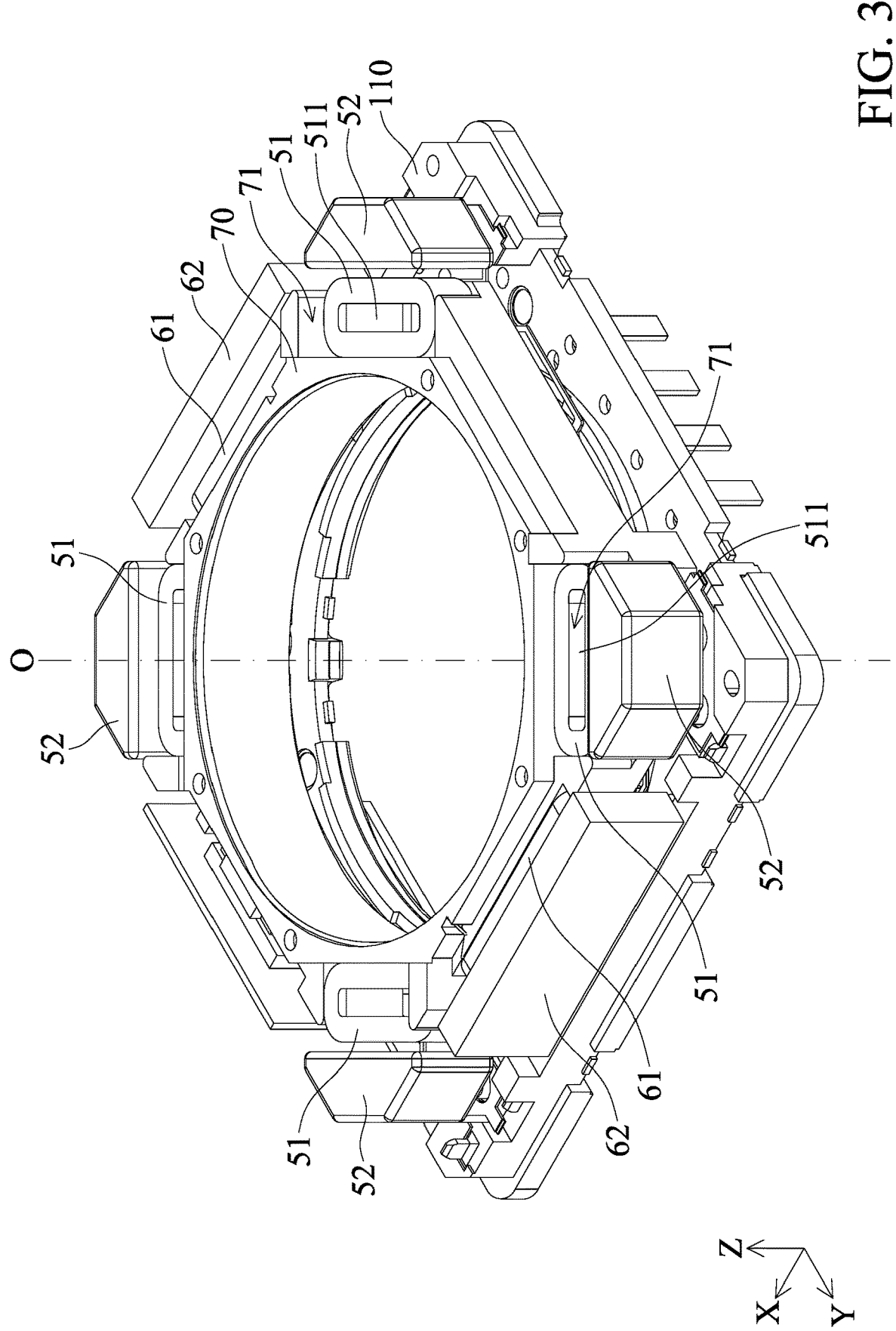
FIG. 3 is a perspective view of the optical element driving mechanism with some elements omitted.

Furthermore, when viewed along a direction that is perpendicular to the optical axis O, the first coil 51 overlaps the holder 70. In some embodiments (as shown in FIG. 3), when viewed along a direction that is perpendicular to the optical axis O, the first coil 51 completely overlaps the holder 70. It represents that the height of the first coil 51 is less than or equal to the height of the holder 70, so that the height of the first coil 51 does not exceed the height of the movable part P2. Therefore, the height of the optical element driving mechanism 1 is mainly affected by the height of the holder 70 and is not limited to the height of the first coil 51. The height of the optical element driving mechanism 1 may be reduced and the overall volume of the optical element driving mechanism 1 may be further reduced by reducing the height of the holder 70.

Similar to the first driving assembly 50, the second coil 61 of the second driving assembly 60 has a substantially elliptical structure. The second magnetic element 62 of the second driving assembly 60 may be a magnet, such as a permanent magnet.

Figure 4:
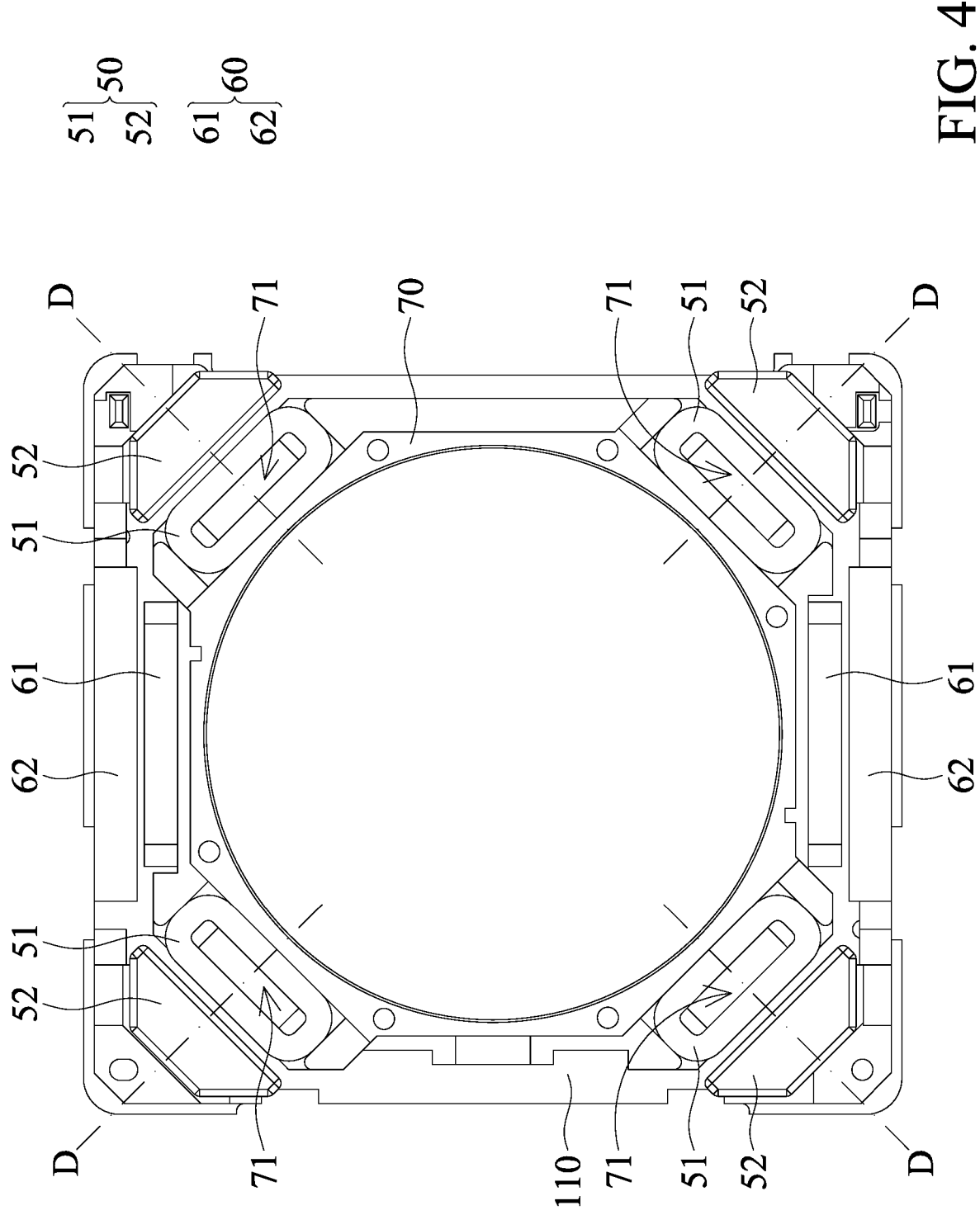
FIG. 4 is a top view of the optical element driving mechanism with some elements omitted.

In regard to FIG. 3 and FIG. 4, how the first driving assembly 50 and the second driving assembly 60 work is described in the following content. FIG. 3 is a perspective view of the optical element driving mechanism 1 with some elements omitted. FIG. 4 is a top view of the optical element driving mechanism 1 with some elements omitted.

The first coil 51 is disposed at the receiving hole 71 of the holder 70. The first magnetic element 52 is disposed at the bottom 110 of the fixed part P1. The positions of the four first coils 51 respectively correspond to the positions of the four first magnetic elements 52. The profile of the bottom 110 of the fixed part P1 is substantially rectangular-shaped. When viewed along a direction that is parallel to the optical axis O, the four first coils 51 and the four first magnetic elements 52 are located at the four corners of the bottom 110.

Before the first driving assembly 50 works, the first coil 51 and the first magnetic element 52 are arranged along an arrangement direction D that is substantially perpendicular to the optical axis O. When viewed along a direction that is parallel to the optical axis O, the first coil 51 does not overlap the first magnetic element 52. However, when the first driving assembly 50 works, a relative motion between the first coil 51 and the first magnetic element 52 may cause the arrangement direction D not completely perpendicular to the optical axis O.

In this embodiment, the first coil 51 is located between the optical axis O and the first magnetic element 52. Alternatively, the position of the first coil 51 and the position of the first magnetic element 52 may be exchanged, so that the first magnetic element 52 is located between the optical axis O and the first coil 51. The first driving assembly 50 may still achieve the same targets and functions.

The holder 70 of the movable part P2 is driven by the first driving assembly 50 to move relative to the bottom 110 of the fixed part P1. When a current is supplied to the first coil 51, the magnetic force is generated between the first coils 51 and the first magnetic elements 52 to drive the holder 70 to move.

In fact, the shock or vibration of the optical element driving mechanism 1 may be complicated. Therefore, the shock or vibration of the holder 70 and the optical element 10 therein may not be limited in the direction that is parallel to or perpendicular to the optical axis O. For example, tilt of the holder 70 and the optical element 10 therein may occur. The first driving assembly 50 may drive the holder 70 to move along a direction (Z-axis) parallel to the optical axis O, thereby achieving auto focus. Or, the first driving assembly 50 may drive the holder 70 to generate an angular displacement of the optical element 10 relative to the central axis M, thereby achieving displacement correction and tilt correction and accomplishing auto focus and optical image stabilization at the same time.

For example, if the magnetic force generated between the first coil 51 and the first magnetic element 52 make the four first coils 51 move the same displacement toward the same direction, the first driving assembly 50 may drive the holder 70 and the optical element 10 therein to move along a direction (Z-axis) parallel to the optical axis O, thereby adjusting the focal length of the optical element 10 and achieving auto focus.

Alternatively, if the magnetic force generated between the first coil 51 and the first magnetic element 52 make two of the four first coils 51 in the diagonal line move toward different directions, the first driving assembly 50 drives the holder 70 of the movable part P2 to rotate, so that an angular displacement of the optical element therein relative to the central axis M of the fixed part P1 is generated, thereby accomplishing auto focus and optical image stabilization at the same time. Furthermore, the two of the first coils 51 in the other diagonal line may generate different displacement depending on actual requirements. To sum up, tilt correction of the overall movable part P2 is adjusted by the combination of the displacement direction(s) and the amount of displacement of the four first coils 51 to achieve displacement correction and tilt correction with higher accuracy and higher efficiency.

It should be noted that the configuration of the first driving assembly 50 is not limited thereto. For example, different configurations shown in FIGS. 12A-12C may be applied to the first driving assembly. It will be discussed in the related content.

The second driving assembly 60 may drive the holder 70 of the movable part P2 to move relative to the bottom 110 of the fixed part P1. When a current is supplied to the second coil 61, an attractive magnetic force or a repulsive magnetic force is generated between the second coils 61 and the second magnetic elements 62 to drive the holder 70 and the optical element 10 therein to move along a direction that is parallel to the optical axis O, thereby assisting with auto focus.

The two second coils 61 are disposed on opposite sides of the holder 70 of the movable part P2. The two second magnetic elements 62 are disposed on opposite sides of the bottom 110 of the fixed part P1. The positions of the two second coils 61 respectively correspond to the positions of the two second magnetic elements 62. A plane on which either of the two second coils 61 is located is not parallel and not perpendicular to a plane on which any of the first coils 51 is located. When viewed along a direction that is perpendicular to the optical axis O, a portion of the first coil 51 overlaps the second coil 61, a portion of the first magnetic element 52 overlaps the second magnetic element 62. Therefore, the volume of the optical element driving mechanism 1 is reduced to achieve miniaturization.

Figure 5A:
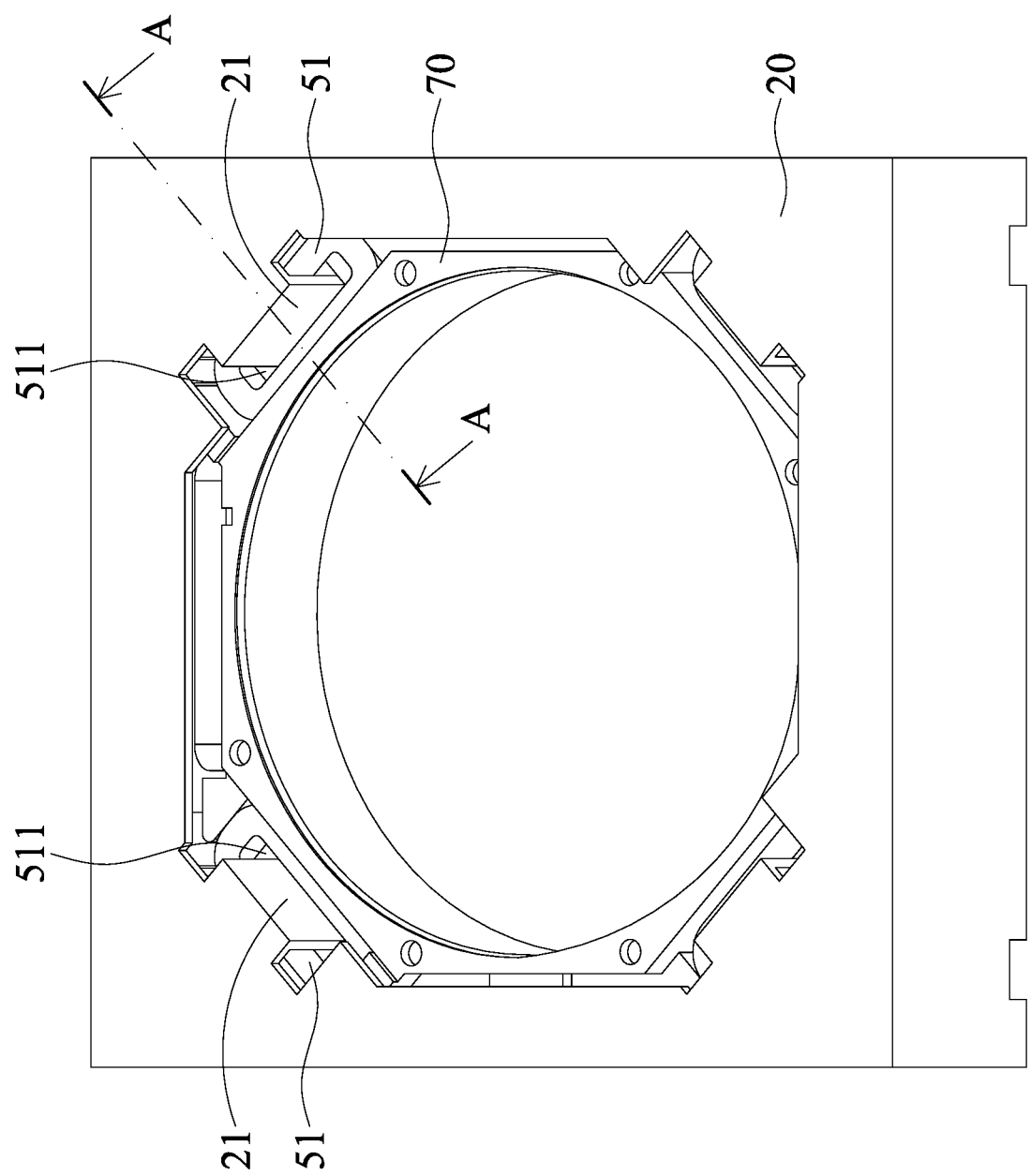
FIG. 5A is a perspective view of the optical element driving mechanism.
Figure 5B:
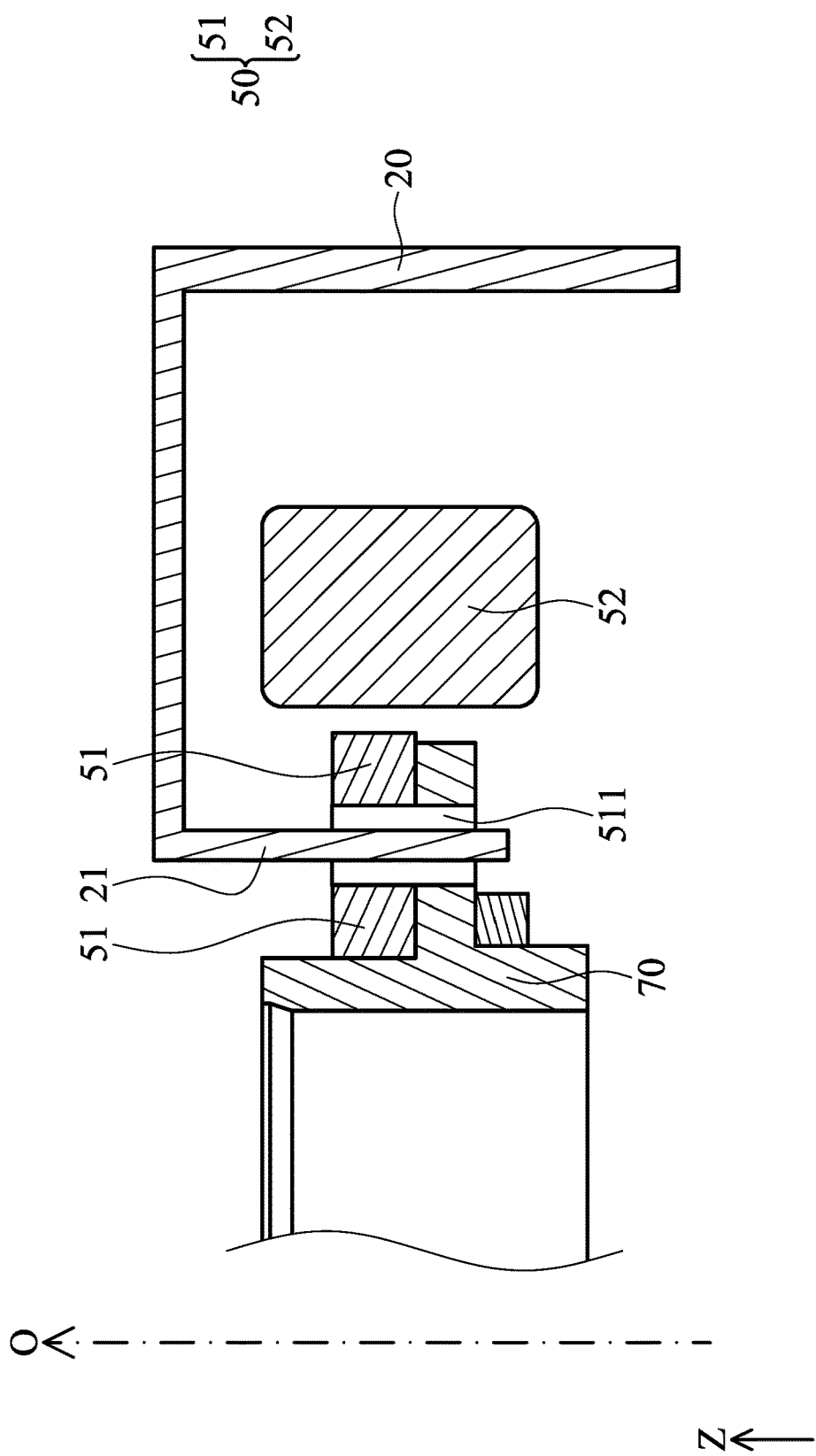
FIG. 5B is a cross-sectional view illustrated along line A-A in FIG. 5A.

Next, please refer to FIG. 5A and FIG. 5B. FIG. 5A is a perspective view of the optical element driving mechanism 1. As shown in FIG. 5A, a portion of the protrusion 21 of the case 20 is located in the perforation 511 of the first coil 51.

FIG. 5B is a cross-sectional view illustrated along line A-A in FIG. 5A. As shown in FIG. 5B, the first coil 51 is located at the receiving hole 71 of the holder 70. The receiving hole 71 is communicated with the perforation 511 of the first coil 51, so that a portion of the protrusion 21 is also located in the receiving hole 71. In particular, the receiving hole 71 not only receives the first coil 51 but also receives a portion of the protrusion 21 of the case 20, so that the height of the holder 70 with the receiving hole 71 is not increased for receiving the protrusion 21 of the case 20, thereby achieving miniaturization of the optical element driving mechanism 1.

FIG. 6 is an exploded view of the optical element driving mechanism 1 in accordance with some embodiments of this disclosure. FIG. 7 is a perspective view of the optical element driving mechanism 1 in FIG. 6. In this embodiment, the first coil 51 is configured to be vertical.

In this disclosure, the first coil 51 may be horizontal or vertical. In detail, the winding axis W of the horizontal first coil 51 is substantially parallel to and not perpendicular to the optical axis O. In contrast, the winding axis W of the vertical first coil 51 is substantially perpendicular to and not parallel to the optical axis O. The different configurations of the horizontal first coil 51 and the vertical first coil 51 have different effects. Users may choose the suitable configuration depending on their requirements.

FIGS. 8A-8C are schematic views of different configurations of the case and the first driving assembly 50, shown in cross-sectional views.

FIG. 8A is a simplified illustration of FIG. 5B. The winding axis W of the first coil 51 is parallel to the optical axis O, which means the first coil 51 is configured to be horizontal. The arrangement direction of the magnetic poles of the first magnetic element 52 is perpendicular to the optical axis O.

The difference between FIG. 8B and FIG. 8A is that the case 20A of FIG. 8B does not include protrusion 21. The difference between FIG. 8C and FIG. 8A is that the winding axis W of the first coil 51 of the first driving assembly 50A is not parallel to and is substantially perpendicular to the optical axis O. That is, the first coil 51 is configured to be vertical, and the magnetic element 52A is a multi-polar magnet.

Here, the definitions of the "horizontal" first coil 51 and the "vertical" first coil 51 may be clearly understood via FIGS. 8A-8C. As shown in FIG. 8A and FIG. 8B, the winding axis W of the first coil 51 is parallel to the optical axis O, representing the "horizontal" first coil 51. The height of the horizontal first coil 51 is defined as the height H1. As shown in FIG. 8C, the winding axis W of the first coil 51 is perpendicular to the optical axis O, representing the "vertical" first coil 51. The height of the vertical first coil 51 is defined as the height H2. For the same first coil 51, the height H2 is greater than the height H1. Therefore, if the configuration of the horizontal first coil 51 is used, the height of the optical element driving mechanism 1 is reduced, and it is beneficial for the optical element driving mechanism 1 to be thinner.

Figure 8D:
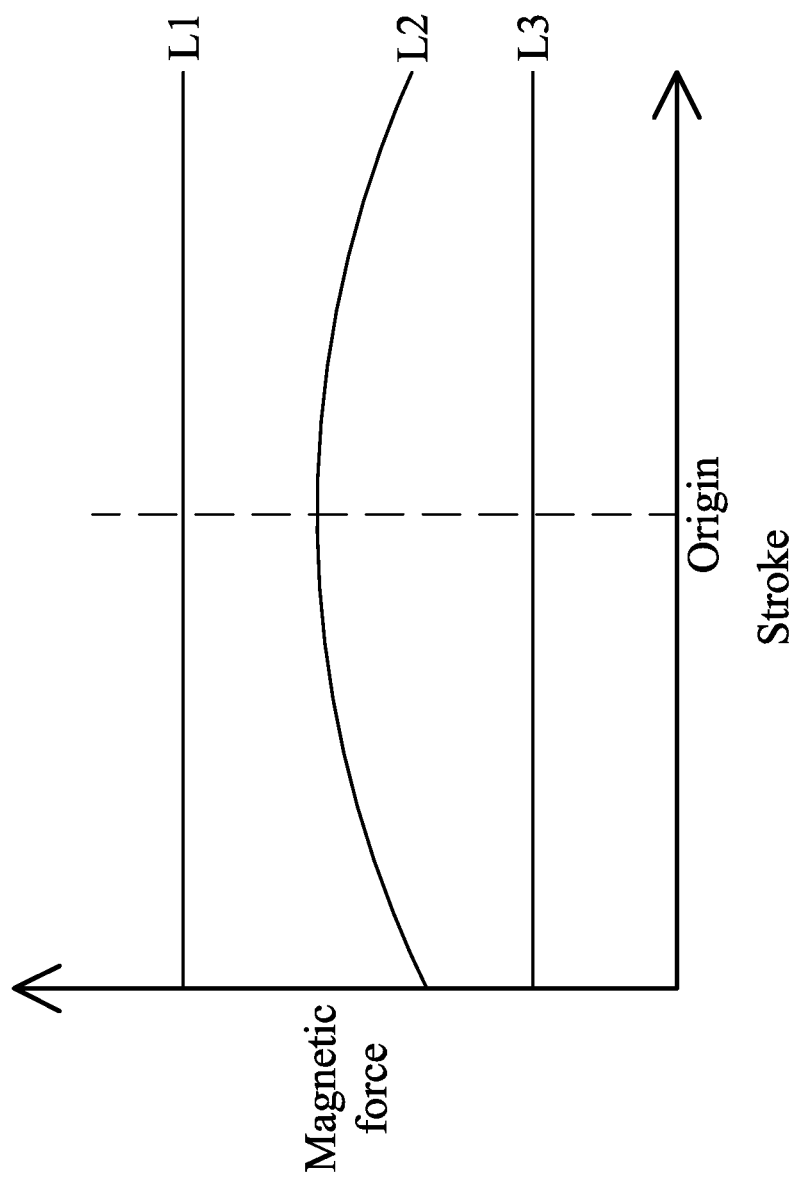
FIG. 8D illustrates the relationship between the magnetic force and the stroke.

FIG. 8D illustrates the relationship between the magnetic force and the stroke. The differences caused by the different configurations of the case 20 and the first driving assembly 50 in FIGS. 8A-8C are illustrated by FIG. 8D.

The magnetic force illustrated in FIG. 8D represents the magnetic force generated between the first coil 51 and the first magnetic element 52. The stroke illustrated in FIG. 8D represents the distance that the optical element 10 moves or the distance that holder 70 and the first coil 51 disposed at the holder 70 move. The origin is the position before the first coil 51 moves. If a position of the stroke is farther to the origin, the distance that the first coil 51 moves is larger and the first coil 51 is farther to the origin.

It should be noted that line L1, line L2, and line L3 are used to represent the relative relationship of the magnitude of the magnetic force and the uniformity of the magnetic force. For example, the magnetic force of line L1 is greater than that of line L2, and the magnetic force of line L2 is greater than that of line L3. When the uniformity of the magnetic force is considered, the uniformity of the magnetic force of line L1 and line L3 are good. That is, wherever the first magnetic element 52 is, the magnetic force generated between the first coil 51 and the first magnetic element 52 is equal. However, for line L2, the largest magnetic force is generated at the origin, when the distance that the first coil 51 moves gets larger, the generated magnetic force decreases. The uniformity of the magnetic force of line L1 and line L3 is better that that of line L2.

The difference between FIG. 8B and FIG. 8A generates a difference in the magnitude of the magnetic force. It is because the current that flows in the left side and the right side of the closed and horizontal first coil 51 are different (for example, flowing into the paper or flowing out of the paper). Under the same magnetic field direction, the directions of the generated magnetic forces of the left side and the right side of the first coil 51 are opposite. A portion of the generated magnetic force of the left side and the right side may be cancelled out.

In FIG. 8A, the case 20 with the protrusion 21 may block the left side and the right side of the first coil 51, preventing the magnetic forces from cancelling each other out. Furthermore, the case 20 is made of a magnetic-permeable material, and the protrusion 21 may attract and concentrate the magnetic force generated between the first coil 51 and the first magnetic element 52, so that more magnetic force is received by the first coil 51. Compared with FIG. 8B, the case 20 with the protrusion 21 in FIG. 8A may get a larger magnetic force than case 20A without the protrusion in FIG. 8B. If FIG. 8D is applied to FIG. 8A and FIG. 8B, FIG. 8A is line L1 and FIG. 8B is line L3.

The difference between FIG. 8C and FIG. 8A generates a difference in the uniformity of the magnetic force. It is because the current that flows in the upper side and in the lower side of the closed and vertical first coil 51 are different (for example, flowing into the paper or flowing out of the paper). Based on the right-hand rule, in order to make the whole first coil 51 to move toward the same direction, different directions of magnetic fields are required for the upper side and the lower side of the first coil 51. Therefore, the first magnetic element 52A corresponding to the vertical first coil 51 in FIG. 8C is a multi-polar magnet. It should be noted that since the magnetic force generated between the first magnetic element 52A and the upper side and the lower side of the first coil 51 in FIG. 8C are the same, a greater thrust may be generated and the manufacturing process may be made easier.

As shown in FIG. 8A, the magnetic field of the first magnetic element 52 sensed by the right side of the first coil 51 may be within a range X1. In contrast, as shown in FIG. 8C, the magnetic field of the first magnetic element 52A sensed by the upper side of the first coil 51 may be within a range X2. The range X2 is smaller than the range X1. It is because the first magnetic element 52A is a multi-polar magnet, and the area of each magnetic pole is only about half of that of the first magnetic element 52. Therefore, the first coil 51 in FIG. 8C corresponds to smaller area of the magnetic pole. Effective area for generating the magnetic force and the movement range of the first coil 51 in FIG. 8C is smaller.

Furthermore, in general, the distribution of lines of magnetic force around the magnetic poles is not uniform. The density of the distribution of lines of magnetic force is higher at the center of the magnetic poles than at ends of the magnetic poles. Therefore, the first coil 51 in FIG. 8C is more likely to move within the range that the density of the distribution of lines of magnetic force of the first magnetic element 52A is lower. For the first coil 51 in FIG. 8C, the generated magnetic force at a distance farther from the origin of is smaller than at the origin. Thus, the uniformity of the magnetic force of the first coil 51 in FIG. 8C is poor than that of the first coil 51 in FIG. 8A. If FIG. 8D is applied to FIG. 8A and FIG. 8C, FIG. 8A is line L1 and FIG. 8C is line L2. It should be noted that the case 20 illustrated in FIG. 8C has the protrusion 21, but whether the case 20 has the protrusion 21 or not, it does not affect too much of the uniformity of the magnetic force of FIG. 8C.

It should be further noted that the magnetic force is inversely proportional to the square of the distance. The right side of the first coil 51 is closer to the first magnetic element 52 than the left side, so that the magnetic force in the right side of the horizontal first coil 51 is greater than that in the left side. That is, although the directions of the generated magnetic force in the left side and in the right side of the horizontal first coil 51 in FIG. 8A and FIG. 8B are opposite, the generated magnetic force in the right side is greater than that in the left side. Thus, the direction of movement of the first coil 51 is determined by the direction of the generated magnetic force in the right side of the first coil 51. In contrast, in FIG. 8C, the distance between the first magnetic element 52A and the upper side of the vertical first coil 51 is the same as the distance between the first magnetic element 52A and the lower side of the vertical first coil 51. Therefore, the directions of the generated magnetic force in the upper side and the lower side of the vertical first coil 51 have to be the same, so that the vertical first coil 51 is able to move. Otherwise, if the directions of the generated magnetic force in the upper side and the lower side of the vertical first coil 51 are opposite, the generated magnetic forces cancel each other out and the vertical first coil 51 may not move. To emphasize again, the upper side and the lower side of the vertical first coil 51 require different directions of magnetic fields, so that the vertical first coil 51 functions with a multi-polar magnet.

Figure 9:
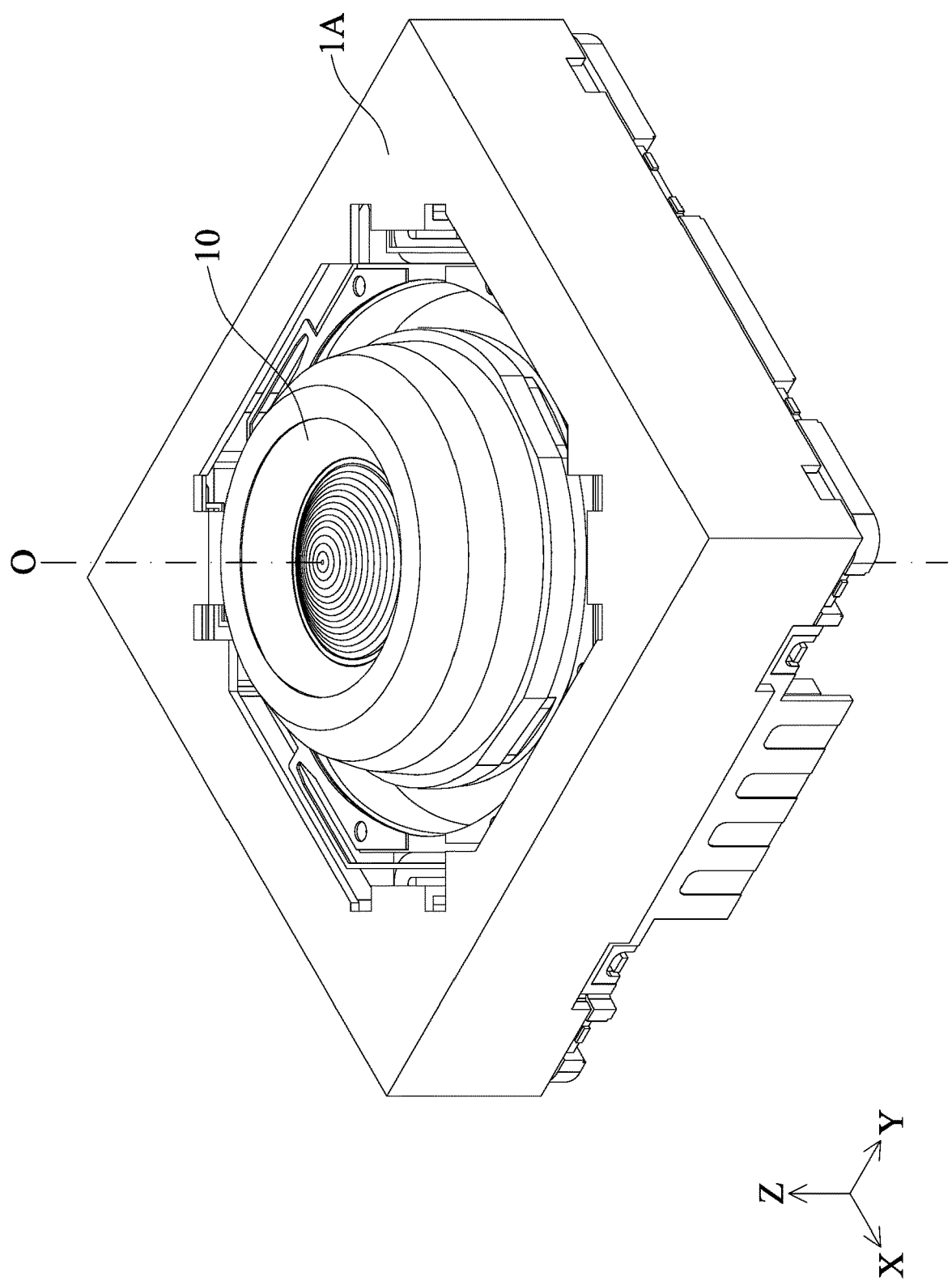
FIG. 9 is a perspective view of an optical element driving mechanism and an optical element in accordance with some embodiments of this disclosure.
Figure 10:
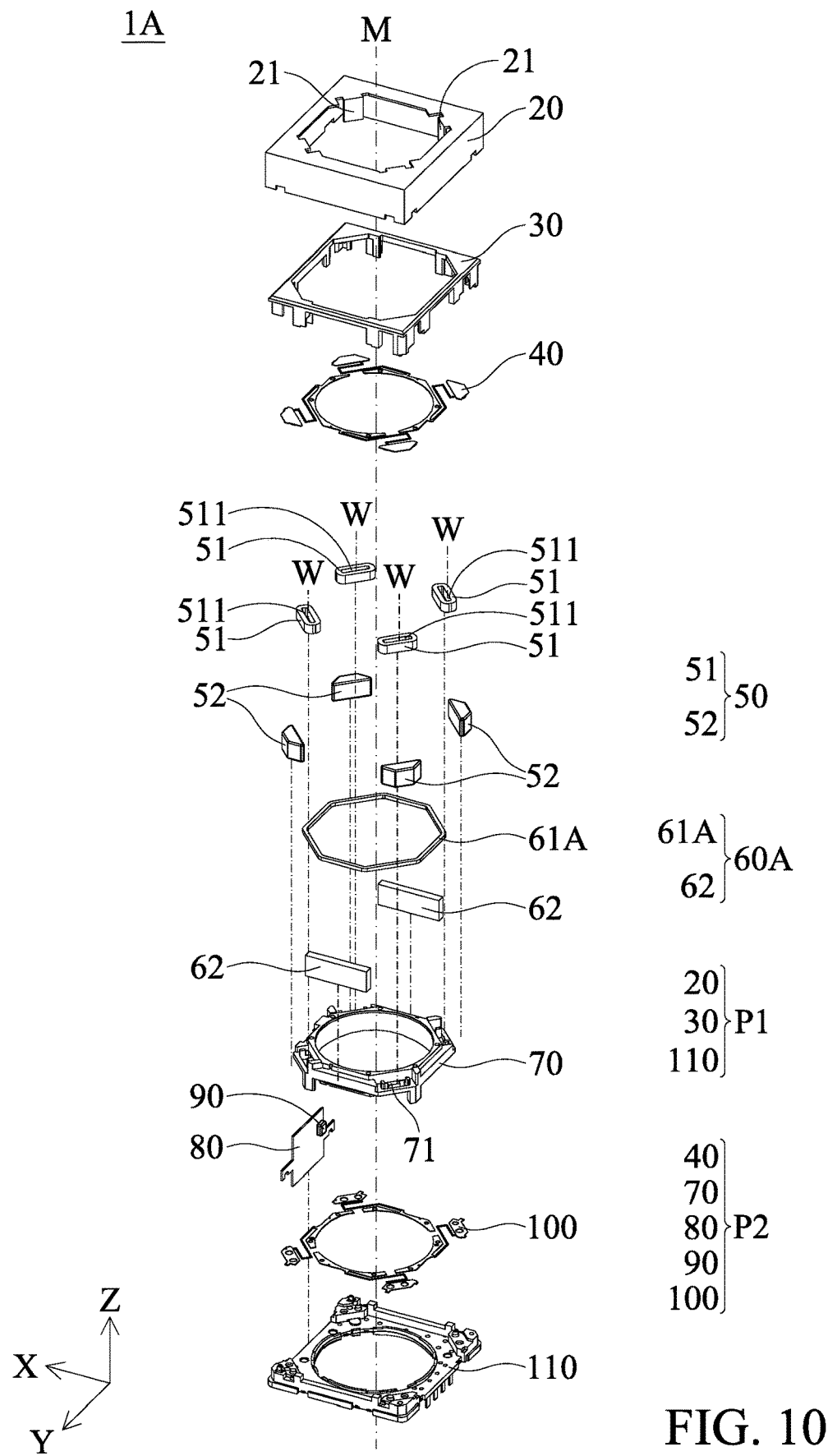
FIG. 10 is an exploded view of the optical element driving mechanism in FIG. 9 in accordance with some embodiments of this disclosure.
Figure 11:
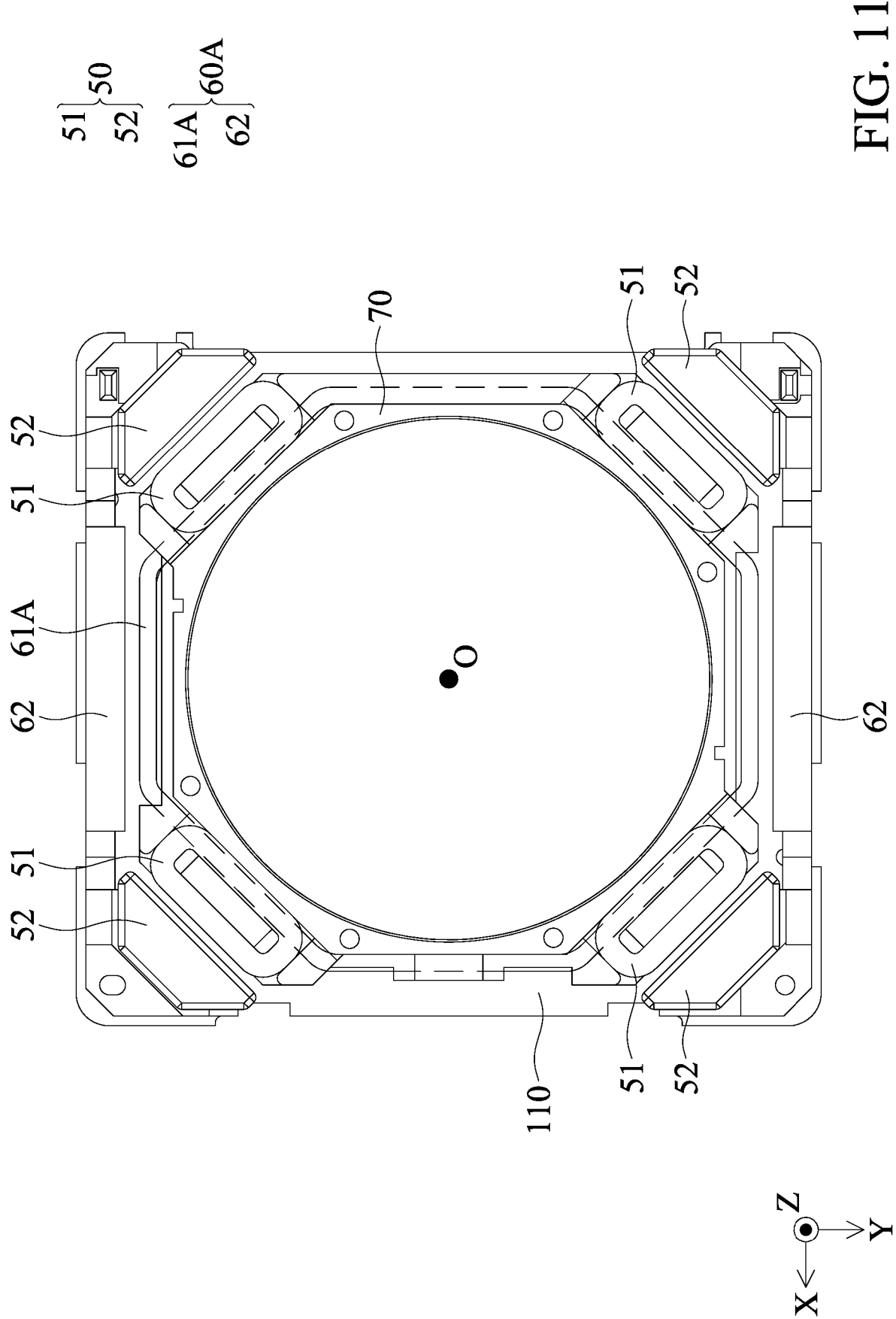
FIG. 11 is a top view of the optical element driving mechanism with some elements omitted.

In the following text, the same elements will be denoted by the same symbols, and similar elements are denoted by similar symbols. The same content will not be described again. FIG. 9 is a perspective view of an optical element driving mechanism 1A in accordance with some embodiments of this disclosure. FIG. 10 is an exploded view of the optical element driving mechanism 1A in FIG. 9. FIG. 11 is a top view of the optical element driving mechanism 1A with some elements omitted.

The difference between the optical element driving mechanism 1A and the optical element driving mechanism 1 is a second coil 61A of a second drive unit 60A. The second coil 61A is not elliptical-shaped as the second coil 61 is. The second coil 61A surrounds the holder 70 of the movable part P2 and thus is polygonal-shaped. In this embodiment, the second coil 61A is octagonal-shaped in accordance with the shape of the holder 70, but the disclosure is not limited thereto. When viewed along a direction that is parallel to the optical axis O, the first coil 51 partially overlaps the second coil 61A. Thus, the volume of the optical element driving mechanism 1A may be reduced to achieve miniaturization.

Figure 12A:
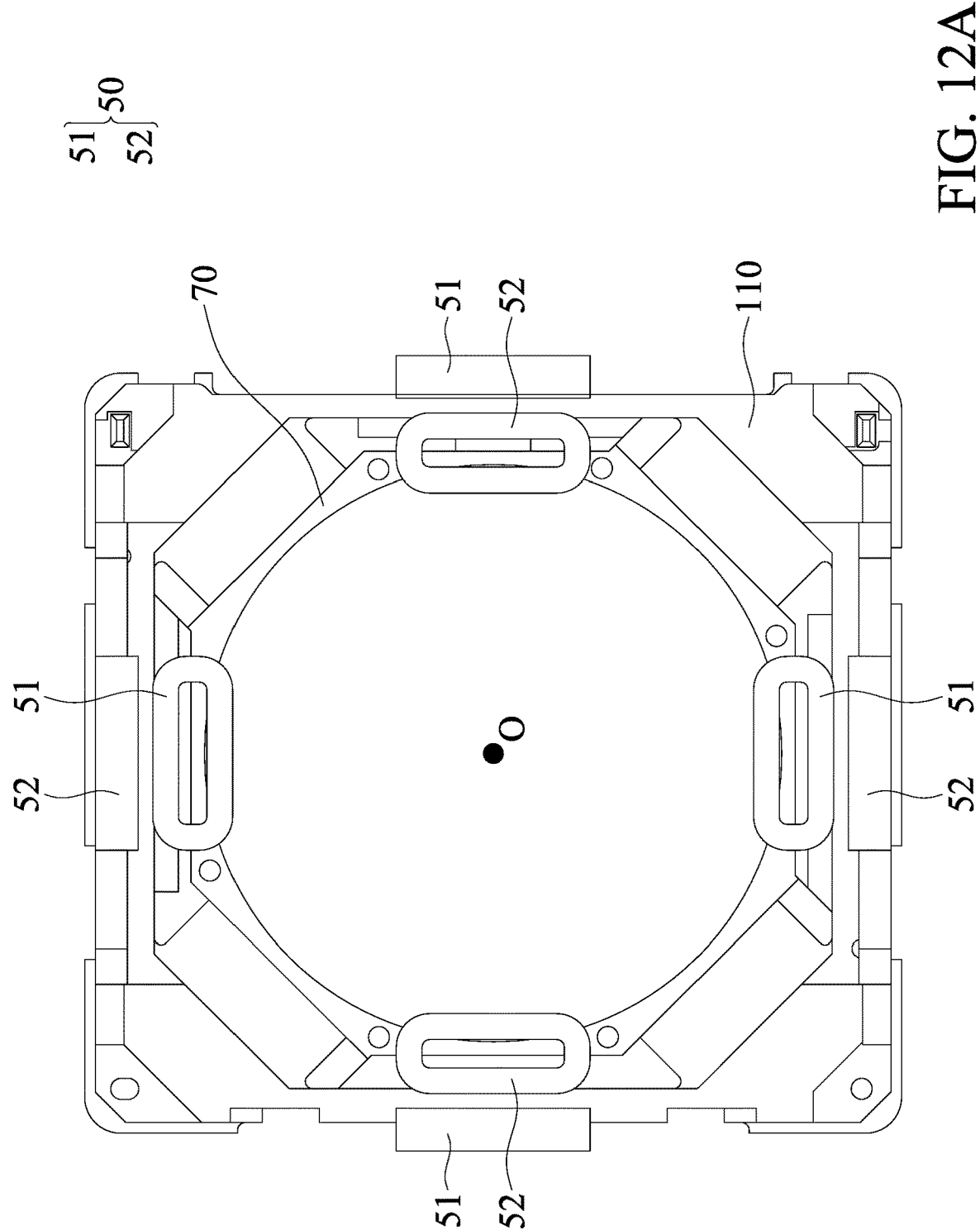
FIGS. 12A-12C are schematic views of different configurations of the first driving assembly.
Figure 12B:
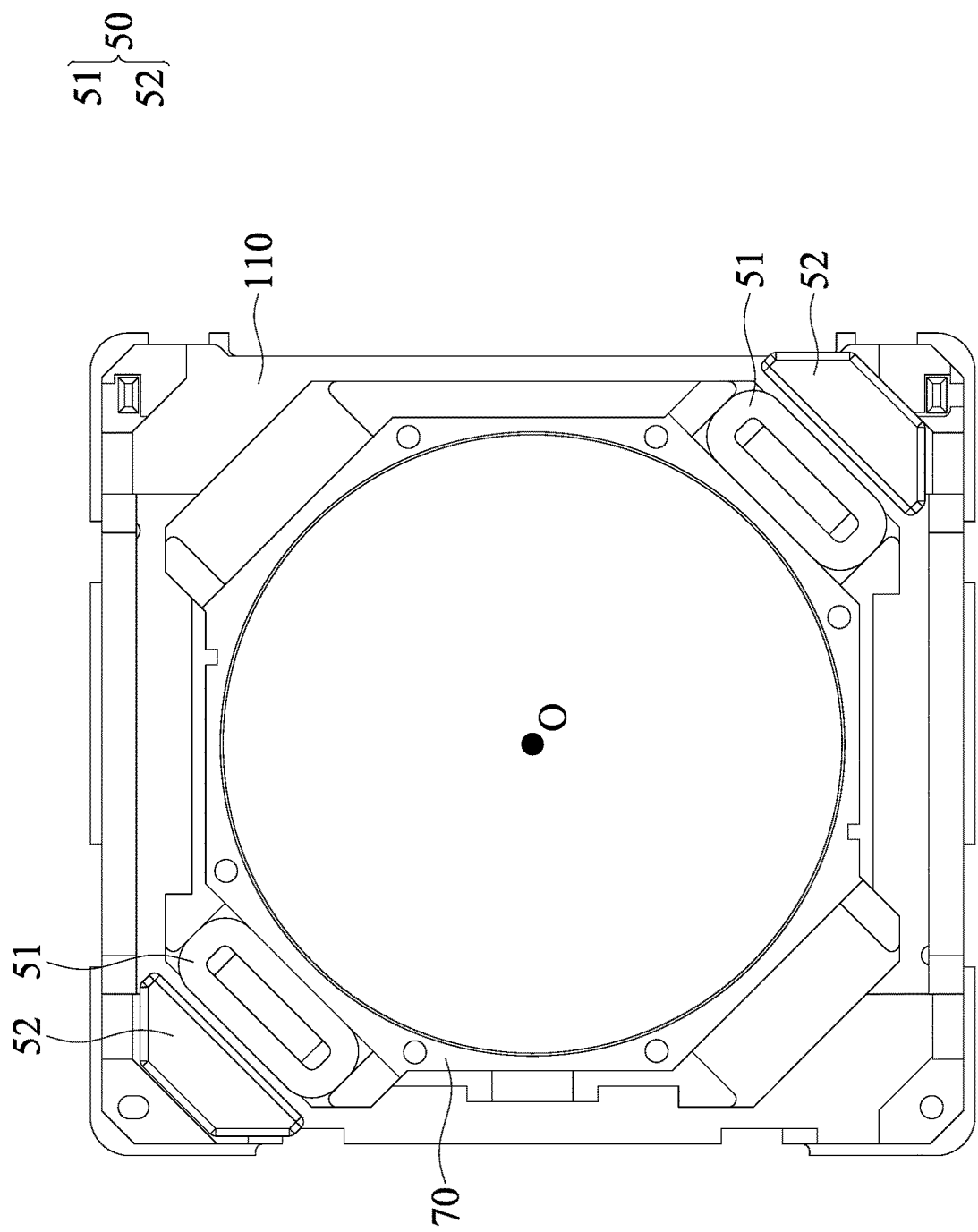
Figure 12B:
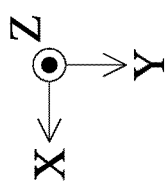
Figure 12C:
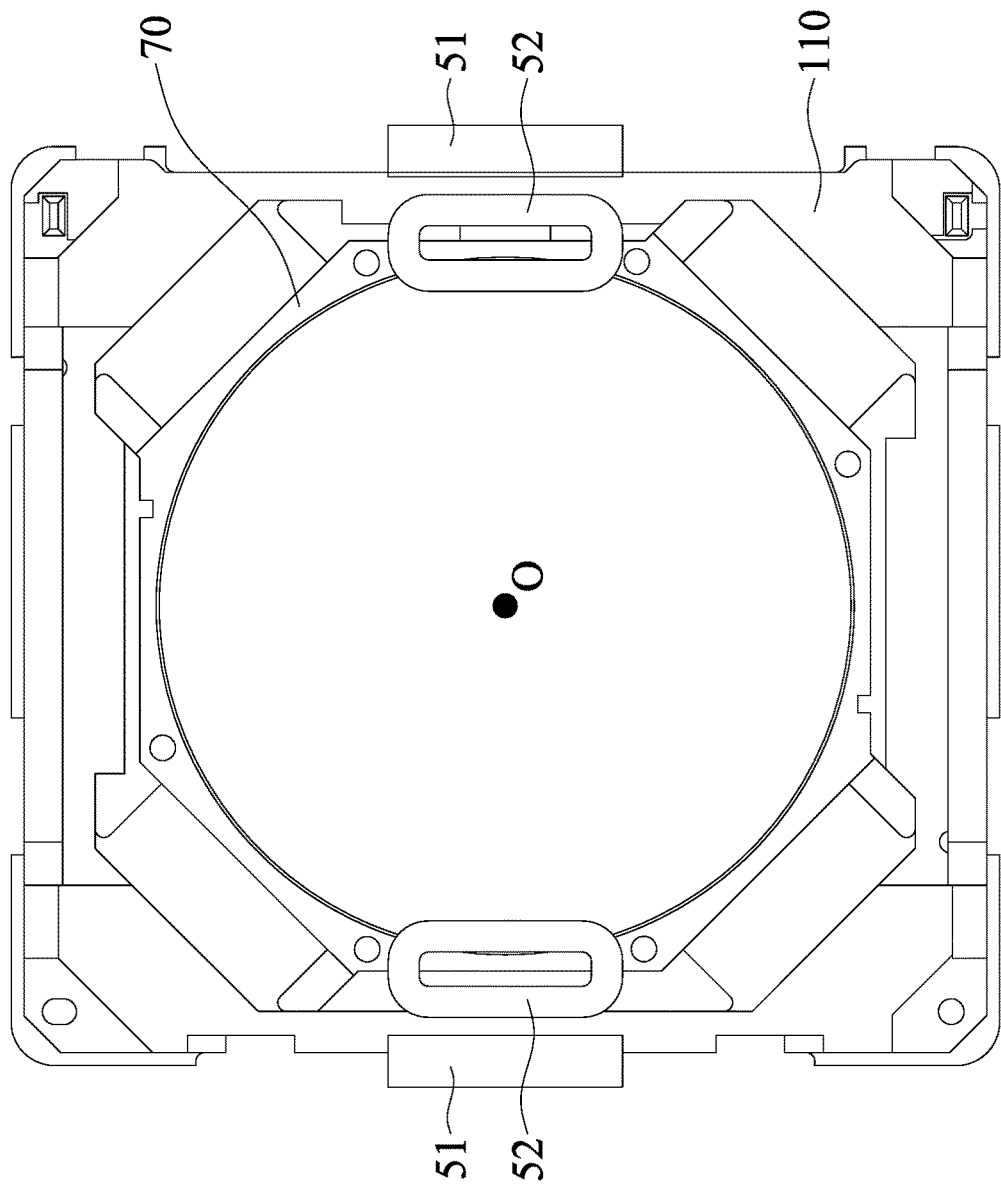

FIGS. 12A-12C are schematic views of different configurations of the first driving assembly 50. It is understood that some elements are omitted herein for illustration, but the first driving assembly 50 illustrated in FIGS. 12A-12C may function with the aforementioned second driving assembly 60 and second driving assembly 60A arbitrarily.

As shown in FIG. 12A, the outline of the bottom 110 of the fixed part P1 is substantially rectangular-shaped. The first driving assembly 50 consists of four first coils 51 and four first magnetic elements 52. The four first coils 51 are disposed at the holder 70 of the movable part P2, and the four first magnetic elements 52 are disposed at the bottom 110 of the fixed part P1. The positions of the four first coils 51 respectively correspond to the positions of the four first magnetic elements 52.

When viewed along a direction that is parallel to the optical axis O, the four first coils 51 and the four first magnetic elements 52 are located at the four sides of the bottom 110. Tilt correction of the overall movable part P2 is accomplished by the four first coils 51 and the four first magnetic elements 52.

As shown in FIG. 12B, the outline of the bottom 110 of the fixed part P1 is substantially rectangular-shaped. The first driving assembly 50 consists of two first coils 51 and two first magnetic elements 52. The two first coils 51 are disposed at the holder 70 of the movable part P2, and the two first magnetic elements 52 are disposed at the bottom 110 of the fixed part P1. The positions of the two first coils 51 respectively correspond to the positions of the two first magnetic elements 52.

When viewed along a direction that is parallel to the optical axis O, the two first coils 51 and the two first magnetic elements 52 are located on the diagonal line of the bottom 110. Tilt correction of the diagonal line of the movable part P2 is accomplished by the two first coils 51 and the two first magnetic elements 52.

As shown in FIG. 12C, the outline of the bottom 110 of the fixed part P1 is substantially rectangular-shaped. The first driving assembly 50 consists of two first coils 51 and two first magnetic elements 52. The two first coils 51 are disposed at the holder 70 of the movable part P2, and the two first magnetic elements 52 are disposed at the bottom 110 of the fixed part P1. The positions of the two first coils 51 respectively correspond to the positions of the two first magnetic elements 52.

When viewed along a direction that is parallel to the optical axis O, the two first coils 51 and the two first magnetic elements 52 are located at two opposite sides of the bottom 110. Tilt correction of the two opposite sides of the movable part P2 is accomplished by the two first coils 51 and the two first magnetic elements 52.

Based on the present disclosure, the first driving assembly is capable of driving the movable part, so that the optical element therein may move in a direction that is parallel to the optical axis and/or generate an angular displacement (rotate) relative to the central axis of the fixed part. In addition, the height of the optical element driving mechanism may be reduced by the horizontal first coil for miniaturization. A larger thrust may be generated and the manufacturing process may be easier by using the vertical first coil. Thus, users may select the horizontal or vertical configuration depending on actual requirements. Furthermore, if the case made of a magnetic-permeable material includes the protrusion, the magnetic force may be strengthened and the uniformity of the magnetic force may be enhanced, so that the optical element driving mechanism of the present disclosure may better achieve the effects of displacement correction and tilt correction.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure.

In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
a fixed part;
a movable part, moving relative to the fixed part and holding an optical element with an optical axis;
a first driving assembly, driving the movable part to move relative to the fixed part, comprising:
a first coil, comprising a winding axis, wherein the winding axis of the first coil is not perpendicular to the optical axis;
a first magnetic element, wherein the first coil and the first magnetic element are arranged in a direction that is substantially perpendicular to the optical axis, and when viewed along a direction that is parallel to the optical axis, the first coil does not overlap the first magnetic element; and a second driving assembly, driving the movable part to move relative to the fixed part, comprising:
  a second coil, surrounding the movable part; and
  a second magnetic element, disposed at the fixed part.

2. The optical element driving mechanism as claimed in claim 1, wherein the first coil is located between the optical axis and the first magnetic element.

3. The optical element driving mechanism as claimed in claim 1, wherein the first magnetic element is located between the optical axis and the first coil.

4. The optical element driving mechanism as claimed in claim 1, wherein the first driving assembly drives the movable part to move relative to the fixed part along a direction that is parallel to the optical axis.

5. The optical element driving mechanism as claimed in claim 1, wherein the fixed part comprises a central axis, and the first driving assembly drives the movable part to generate an angular displacement of the optical axis relative to the central axis.

6. The optical element driving mechanism as claimed in claim 1, wherein the first coil is disposed at the movable part, the first magnetic element is disposed at the fixed part, and a position of the first coil corresponds to a position of the first magnetic element.

7. The optical element driving mechanism as claimed in claim 1, wherein the movable part comprises a holder holding the optical element, and the holder and the fixed part are separated by a distance.

8. The optical element driving mechanism as claimed in claim 7, wherein when viewed along a direction that is perpendicular to the optical axis, the first coil overlaps the holder.

9. The optical element driving mechanism as claimed in claim 1, wherein the fixed part comprises a case made of a magnetic-permeable material, and the case comprises a protrusion that extends in a direction that is parallel to the optical axis.

10. The optical element driving mechanism as claimed in claim 9, wherein the first coil is provided with a central hole, and a portion of the protrusion of the case is located in the central hole of the first coil.

11. The optical element driving mechanism as claimed in claim 9, wherein the movable part comprises a holder holding the optical element, the holder is provided with a receiving hole for receiving the first coil, and a portion of the protrusion of the case is located in the receiving hole.

12. The optical element driving mechanism as claimed in claim 1, wherein in a top view, the fixed part is substantially rectangular, the first driving assembly consists of two first coils and two first magnetic elements, and when viewed along a direction that is parallel to the optical axis, the two first coils and the two first magnetic elements are located on a diagonal line of the rectangle.

13. The optical element driving mechanism as claimed in claim 1, wherein in a top view, the fixed part is substantially rectangular, the first driving assembly consists of two first coils and two first magnetic elements, and when viewed along a direction that is parallel to the optical axis, the two first coils and the two first magnetic elements are located at two opposite sides of the rectangle.

14. The optical element driving mechanism as claimed in claim 1, wherein in a top view, the fixed part is substantially rectangular, the first driving assembly consists of four first coils and four first magnetic elements, and when viewed along a direction that is parallel to the optical axis, the four first coils and the four first magnetic elements are located at four corners of the rectangle.

15. The optical element driving mechanism as claimed in claim 1, wherein in a top view, the fixed part is substantially rectangular, the first driving assembly consists of four first coils and four first magnetic elements, and when viewed along a direction that is parallel to the optical axis, the four first coils and the four first magnetic elements are located at four sides of the rectangle.

16. The optical element driving mechanism as claimed in claim 1, wherein when viewed along a direction that is parallel to the optical axis, the first coil partially overlaps the second coil.

17. An optical element driving mechanism, comprising:
  a movable part, moving relative to the fixed part and holding an optical element with an optical axis;
  a first driving assembly, driving the movable part to move relative to the fixed part, comprising:
    a first coil, comprising a winding axis, wherein the winding axis of the first coil is not perpendicular to the optical axis;
    a first magnetic element, wherein the first coil and the first magnetic element are arranged in a direction that is substantially perpendicular to the optical axis, and when viewed along a direction that is parallel to the optical axis, the first coil does not overlap the first magnetic element and
  a second driving assembly driving the movable part to move relative to the fixed part, comprising:
  two second coils; and two second magnetic elements, wherein positions of the second coils correspond to positions of the second magnetic elements, and a line on which either of the two second coils is located is not parallel to and not perpendicular to a line on which the first coil is located.

18. The optical element driving mechanism as claimed in claim 17, wherein the second coils are disposed at opposite sides of the movable part, the second magnetic elements are disposed on opposite sides of the movable part, wherein when viewed along a direction that is perpendicular to the optical axis, the second driving assembly partially overlaps the first driving assembly.

19. An optical element driving mechanism, comprising:
  a fixed part;
  a movable part, moving relative to the fixed part and holding an optical element with an optical axis; and
  a first driving assembly, driving the movable part to move relative to the fixed part, comprising:
    a first coil, comprising a winding axis, wherein the winding axis of the first coil is not parallel to the optical axis;
    a first magnetic element, wherein the first coil and the first magnetic element are arranged in a direction that is substantially perpendicular to the optical axis, and when viewed along a direction that is parallel to the optical axis, the first coil does not overlap the first magnetic element and
  a second driving assembly driving the movable part to move relative to the fixed part, comprising:
  two second coils; and
  two second magnetic elements, wherein positions of the second coils correspond to positions of the second magnetic elements, and a line on which either of the two second coils is located is not parallel to and not perpendicular to a line on which the first coil is located.

* * * * *